United States Patent [19]
Davidson et al.

[11] 3,752,993
[45] Aug. 14, 1973

[54] SPACECRAFT ATTITUDE SENSOR

[75] Inventors: Arthur C. Davidson, Davidsonville; McLean M. Grant, Silver Spring, both of Md.

[73] Assignee: The United States of America as represented by the Administrator of the National Aeronautics and Space Administration, Washington, D.C.

[22] Filed: Feb. 2, 1971

[21] Appl. No.: 111,998

[52] U.S. Cl............... 250/203 R, 250/209, 250/236, 244/1 SA
[51] Int. Cl............................... G01j 1/20
[58] Field of Search................. 250/203, 209, 236, 250/83.3 IR; 244/3.16, 3.17, 1 SA; 102/70.2 P

[56] References Cited
UNITED STATES PATENTS

| | | |
|---|---|---|
| 3,311,747 | 3/1967 | Smith, Jr. et al. ............... 250/203 X |
| 3,508,068 | 4/1970 | Harris et al. ......................... 250/236 |
| 3,519,823 | 7/1970 | Heller et al. ................... 250/83.3 IR |
| 3,350,033 | 10/1967 | Goldberg ......................... 250/236 X |
| 3,486,026 | 12/1969 | Bez .............................. 250/83.3 IR |

*Primary Examiner*—Walter Stolwein
*Attorney*—R. F. Kempf, Neil B. Siegel and John R. Manning

[57] ABSTRACT

A system for sensing the attitude of a spacecraft includes a pair of optical scanners having a relatively narrow field of view rotating about the spacecraft $x$-$y$ plane. The spacecraft rotates about its $z$ axis at a relatively high angular velocity while one scanner rotates at low velocity, whereby a panoramic sweep of the entire celestial sphere is derived from the scanner. In the alternative, the scanner rotates at a relatively high angular velocity about the $x$-$y$ plane while the spacecraft rotates at an extremely low rate or at zero angular velocity relative to its $z$ axis to provide a rotating horizon scan. To avoid ambiguity while the spacecraft is spinning at an extremely low velocity or is stationary relative to its $z$ axis, the scanners are successively activated during alternate scans. The positions of the scanners about the $x$-$y$ plane are read out to assist in a determination of attitude. While the satellite is spinning at a relatively high angular velocity, the angular positions of the bodies detected by the scanners are determined relative to the sun by providing a sun detector having a field of view different from the scanners.

22 Claims, 7 Drawing Figures

PATENTED AUG 14 1973 3,752,993

INVENTORS,
ARTHUR C. DAVIDSON
MCLEAN M. GRANT
BY Neil B. Siegel

ATTORNEYS

INVENTORS,
ARTHUR C. DAVIDSON
MCLEAN M. GRANT
BY Neil B. Siegel
ATTORNEYS

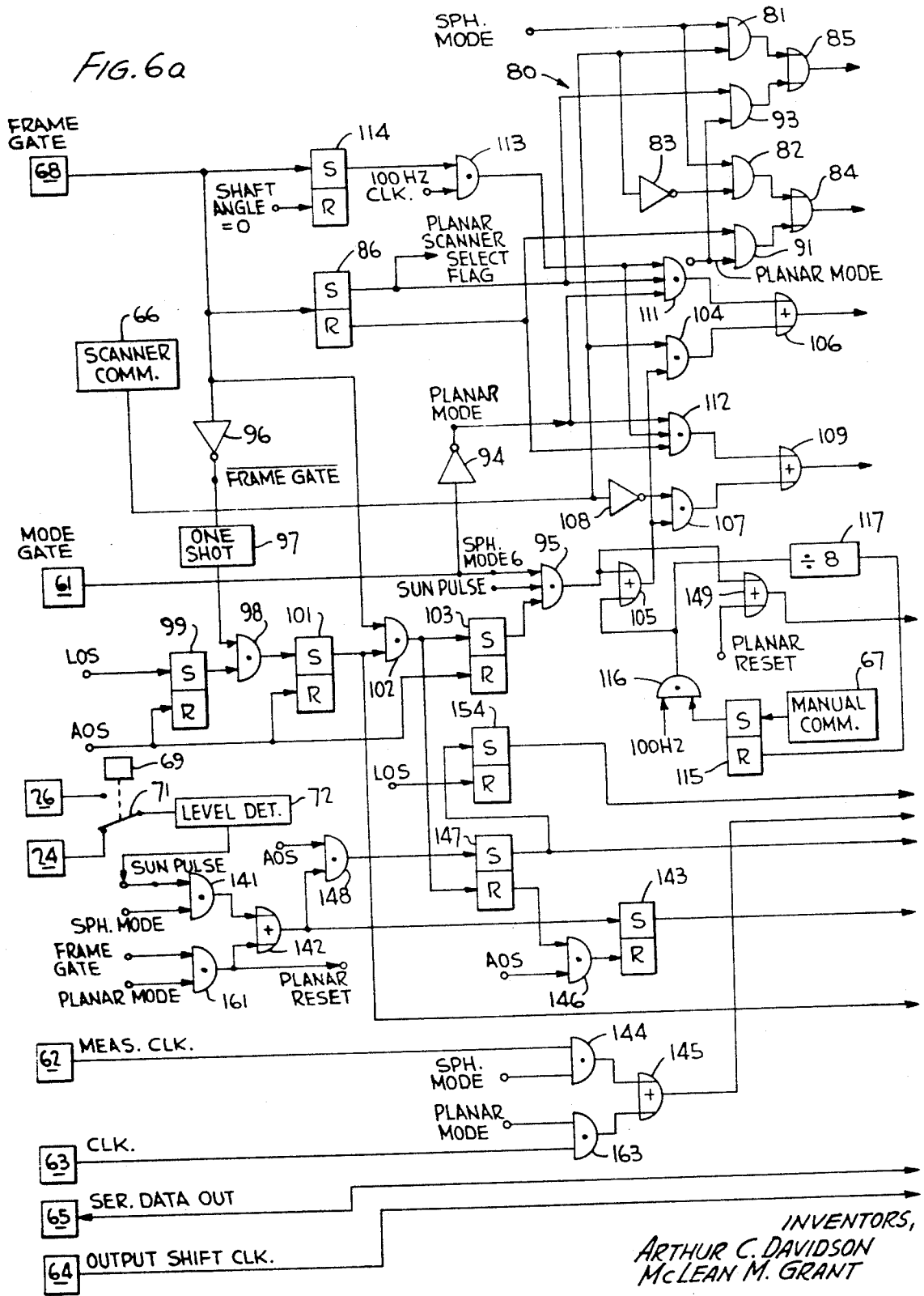

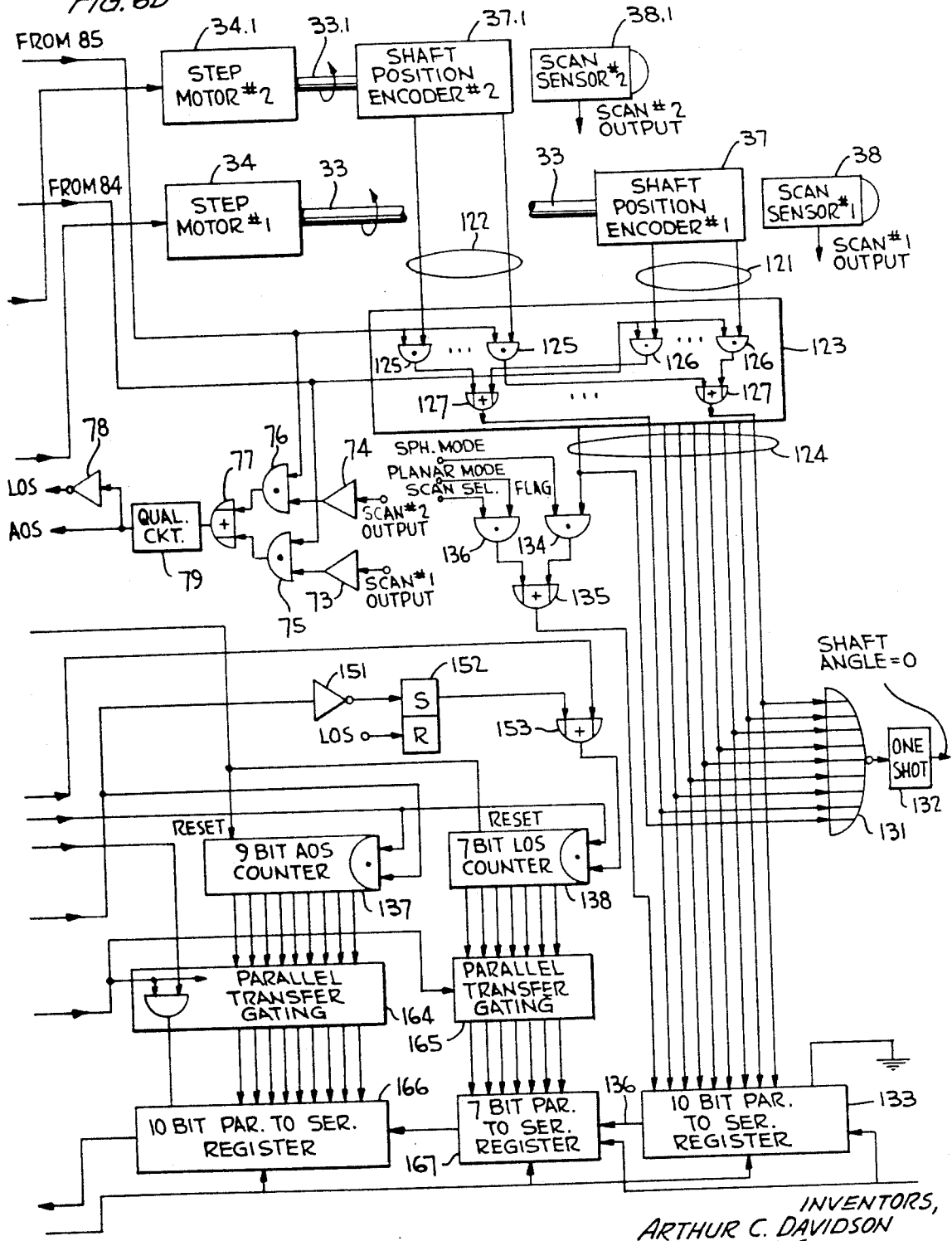

SPACECRAFT ATTITUDE SENSOR

ORIGIN OF THE INVENTION

The invention described herein was made by employees of the United States Government and may be manufactured and used by or for the Government for governmental purposes without the payment of any royalties thereon or therefor.

FIELD OF INVENTION

The present invention relates generally to spacecraft attitude sensing systems and more particularly to a spacecraft attitude sensing system wherein a sensor having a relatively narrow field of view is rotated about the spacecraft x-y plane.

BACKGROUND OF THE INVENTION

Spacecraft attitude sensors generally rely upon magnetic or radiant energy principles, or combinations thereof. Magnetic attitude sensors are generally limited in use to earth orbiting spacecraft because of the weak magnetic field existing far beyond the earth and in proximity to certain other celestial bodies, such as the moon. Radiant energy attitude sensors generally include infrared or visible spectrum detectors responsive to the horizon of a relatively nearby celestial body or from the stars. The infrared and star detectors are beset by problems of weight because they require complex apparatus, such as cryogenic means for cooling infrared detectors or high voltage power supplies for sensitive photomultiplier tubes.

All presently existing, proven systems do not have a capability required for many flights wherein a spacecraft is launched from earth, proceeds to a celestial body and then orbits the body for a relatively long period. In flights of this nature, the craft usually spins at a relatively high velocity about its z axis while travelling to the celestial body and continues to spin at a high velocity during orbiting of the celestial body until orbit stability is achieved. In certain flights after orbit stability has been achieved it is desired to reduce the spacecraft spin velocity to an extremely low level on the order of one-quarter revolution per minute or less; in certain instances the spacecraft has zero spin and gravity gradient stability for the spacecraft is employed. While one system has been designed to sense the attitude of a spacecraft under these diverse conditions, this system requires an extremely complex ground station computer program. The program must include a multiplicity of stored star maps which are compared on an iterative basis with data detected by sensors on the spacecraft.

In accordance with the present invention, there is provided a spacecraft attitude sensor having a relatively narrow field of view which is rotated about the spacecraft x-y plane. The system is compatible for spacecraft operating in two distinct modes. In one mode, designated herein as the spherical mode, the spacecraft rotates at a relatively high angular velocity, between 4 and 50 revolutions per minute, about its z axis; in the second mode, designated as the planar mode, the spacecraft rotates at an extremely low angular velocity, one-quarter revolutions per minute or less about its z axis or does not rotate at all. In the spherical mode, rotation of the sensor about the x-y plane causes a spiral scan to be traced, whereby a panoramic field of view of the entire celestial sphere is ultimately obtained by the scanner. In the planar mode, the sensor rotates at a relatively high velocity about the spacecraft x-y plane to provide a rotating scan of the horizon. In both modes, the scanning detector is responsive to targets sufficiently close to appear as large visible light emitting bodies, e.g., the earth, sun and moon for a lunar voyage. Because relatively large, visible light emitting bodies are targets for the scanner, detectors included therein can be of the visible ray type and need not be extremely sensitive, thereby obviating the need for cryogenic sources and high voltage power supplies associated with photomultiplier tubes.

While the spacecraft is flying in the planar mode, there is a possibility of ambiguity in the output signal thereof as it orbits a celestial body at a relatively low altitude. To enable the ambiguity to be eliminated, the system of the present invention includes a pair of scanners having different pointing angles. The scanners are rotated alternately about the spacecraft x-y plane to provide differing fields of view which can be read out and detected by a ground station to eliminate ambiguity. While it is not necessary to employ a pair of scanners while the spacecraft is flying in a spherical mode, the use of a pair of scanners provides redundancy and thereby greater reliability in this mode.

While the system is operating in the spherical mode, a scanner is normally stepped once about the x-y plane for each revolution of the spacecraft about its z axis, thereby to provide the panoramic scan. Each step occurs in response to detection of the image of a reference body, such as the sun, by a reference body detector, which is different from that of the scanner. Scanner stepping continues until the scanner detects a target, such as the sun, the illuminated earth or illuminated moon. While a detected target is in the scanner field of view scanner stepping may proceed at an irregular rate so that data indicative of scanner position are read out while the scanner is stationary. Thereby, possible errors in reading out incorrect target position are avoided. After the target is no longer being detected by the scanner, rotation of the scanner about the spacecraft x-y plane proceeds on a regular basis in response to each detected sun pulse.

The high speed horizon scan is derived in the planar mode by rotating a selected scanner about the x-y plane at a relatively high rate. The selected scanner is rotated through a predetermined arc about the spacecraft x-y plane, which has a tendency to be at right angles to a line through the center of the body being orbited. After the selected scanner has been rotated through the predetermined arc it is stopped and the other scanner then rotates about the spacecraft x-y plane through the predetermined arc. Thereby, the two scanners are alternately activated to prevent ambiguity.

To enable the position of a target detected by the scanning sensor to be determined relative to the spacecraft x-y plane, the position of each scanner is monitored by a shaft position encoder. The angular position about the z axis of the target is monitored by comparing the target detection time relative to a substantially periodic signal. In the spherical mode the periodic signal is responsive to the occurrence of a sun pulse and in the planar mode it is responsive to a clock source. The time difference and scanner position about the x-y spacecraft plane are transmitted as signals to a ground station where they are processed to determine spacecraft attitude.

It is, accordingly, an object of the present invention to provide a new and improved spacecraft attitude control system.

Another object of the invention is to provide a new and improved system for and method of deriving a panoramic field of view.

Yet another object of the invention is to provide a new and improved system for and method of providing a panoramic field of view of the celestial sphere from a spinning spacecraft.

Another object of the invention is to provide a new and improved method of and apparatus for deriving a horizon scan from a spacecraft.

A further object of the invention is to provide a new and improved system for and method of sensing the attitude of a spacecraft capable of spinning at relatively high or low velocities about an axis or having zero spin velocity about the axis.

Yet another object of the invention is to provide a system for controlling scanning detectors of a spacecraft attitude sensor, wherein the spacecraft is capable of either spin stabilization, three axis control stabilization or gravity gradient stabilization.

Yet another object of the invention is to provide a new and improved system for monitoring the position of scanning optical sensors on a spacecraft susceptible to high and low speed angular velocity about an axis, as well as zero velocity about the axis.

Yet another object of the invention is to provide a new and improved spacecraft attitude sensor system capable of operating at ambient temperatures and at relatively low power supply voltages so that it has minimum space and power requirements.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

FIGS. 6a and 6b, together, are a circuit block diagram of a logic network for controlling the scanners and reading out signals indicative of their position.

SPACECRAFT AND SCANNING CONCEPTS

Figure 1:
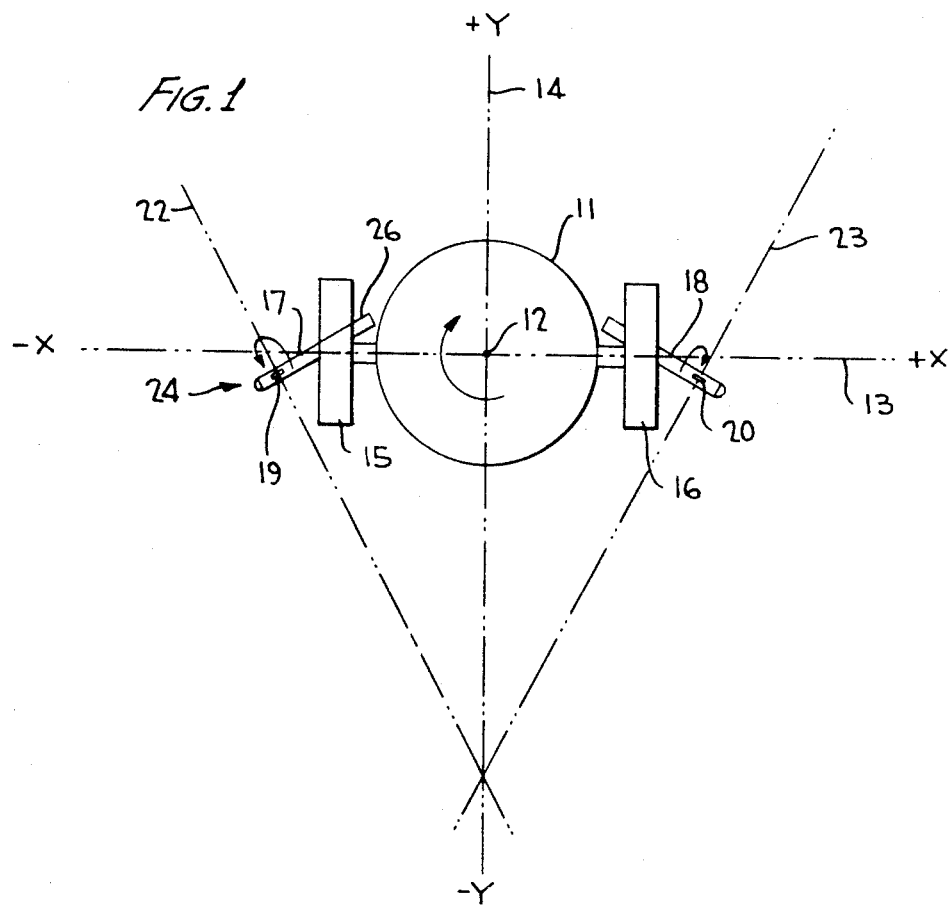
FIG. 1 is a top view of a spacecraft including attitude sensors in accordance with the present invention.
Figure 2:
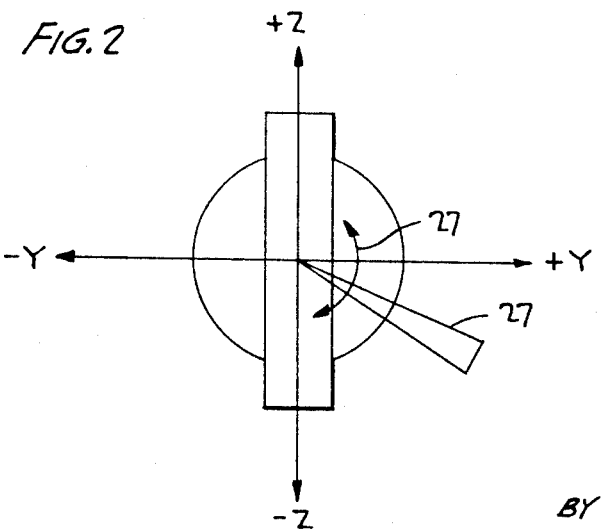
FIG. 2 is a side view of a spacecraft including an attitude sensor in accordance with the present invention.
Figure 3:
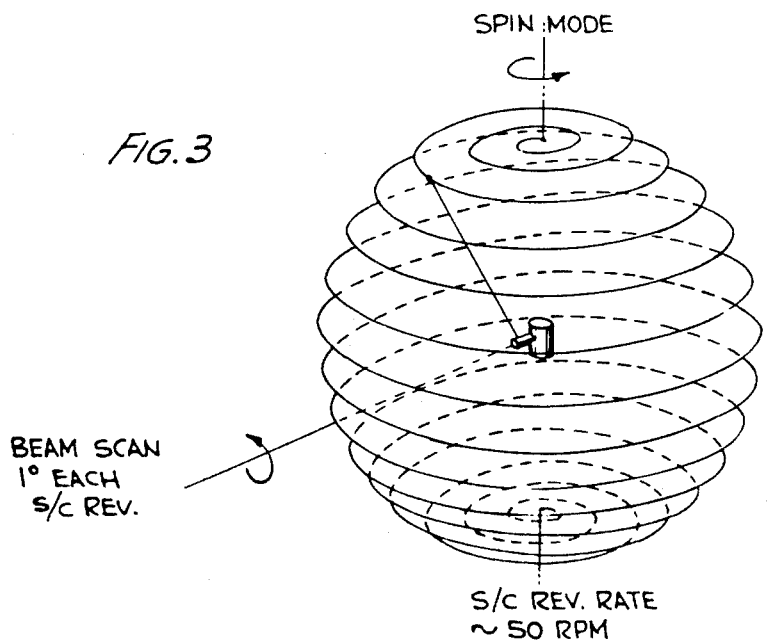
FIG. 3 is a perspective view illustrating the panoramic scan derived from sensors included on the spacecraft illustrated in FIGS. 1 and 2, in accordance with one mode of operation.

Reference is now made to FIGS. 1–3 of the drawings wherein there is illustrated a spacecraft 11 having a z axis 12 about which the spacecraft is adapted to spin, as well as x and y axes 13 and 14 which in the gravity gradient stabilization mode lie in an x-y plane at right angles to the z axis. The forward velocity vector of spacecraft 11 in a non-spinning stabilization mode, is generally along y axis 14. Spacecraft 11 is adapted for flight from earth to a celestial body, such as the moon, about which it orbits while flying in a high spin (4 to 50 revolutions per minute), or spherical, mode. The spacecraft 11 orbits the celestial body in the spherical mode until orbit stability is achieved. At that time, spacecraft 11 spherical mode operation is discontinued and the spacecraft is spin stabilized at a relatively low angular velocity (one quarter rpm or less) about z axis 12. In the alternative, spacecraft 11 can be stabilized while in lunar orbit by a gravity gradient boom, whereby there is zero rotation of the spacecraft about the axis 12 that has a tendency to be aligned with a line extending through the center of the body being orbited. The means for and method of controlling the spin rate and attitude of spacecraft 11 are well known so that there is no need to consider them herein.

Fixedly mounted on spacecraft 11 are a pair of paddles 15 and 16 extending in opposite directions from spacecraft 11 along x axis 13. While an actual spacecraft may include more than two paddles only two are described and illustrated specifically herein because the remaining paddles perform no function in the system to be described. Paddles 15 and 16 carry scanning detector assemblies 17 and 18, respectively. Scanning assemblies 17 and 18 respectively include optical, visible spectrum scanning detectors 19 and 20, having a relatively narrow field of view, typically on the order of one degree. In one preferred embodiment scanners 19 and 20 include visible light photodetectors that respond only to targets having a relatively high intensity visible light image, such as the sun, and the sun illuminated surfaces of the earth and moon. The fields of view of detectors or scanners 19 and 20 are rotated about the longitudinal axes of assemblies 17 and 18 respectively in order to view along lines perpendicular to the longitudinal axes of assemblies 17 and 18. The longitudinal axes of assemblies 17 and 18 are contained in the x-y plane and are displaced from x axis 13 by an angle of 28° so that the directions of view contained in planes 22 and 23 of the two detectors are displaced from each other by an angle of 56°. The use of a pair of scanning detectors having directions of view 22 and 23 which cross each other by an angle of 56° is particularly advantageous while the spacecraft is in the planar mode to eliminate ambiguity. In such a mode, ambiguity is eliminated by alternately deriving directions of view 22 and 23 by alternately rotating scanners 19 and 22.

At the end of assembly 17 remote from paddle 15 is fixedly mounted sun detector 24, having a relatively narrow field of view coincident with the axis of assembly 17. The field of view of detector 24 typically has a width on the order of one-half a degree in the x-y plane, while having a field of view of approximately 180° in the y-z plane. While spacecraft 11 is flying in the spherical mode, sun detector 24 enables a sun reference signal or pulse to be derived for controlling scanners 19 and 20 and enabling indications of the detectors angular position to be derived. In the event of there being two targets for any given scan, use of the sun pulse from detector 24 as a reference enables the information from the first target to be used. Therefore, sun detector 26 is provided as an option to enable the information from the second target to be measured. Sun detector 26 is fixedly mounted on paddle 15 and has a longitudinal axis substantially coincident with the axis of assembly 17. Sun detectors 24 and 26 have fields of view with the same dimensions which, however, are spatially displaced 180° from each other so that a sun pulse can be derived if an umbra is cast by a celestial body on sun detector 24. Selection of one of sun detectors 24 or 26 is made from a ground station, dependent upon the known position of the spacecraft relative to the targets being scanned.

While the spacecraft is in the planar mode a horizon scan through a predetermined arc, selected to equal 360°, is provided by alternate rotations of detectors 19 and 20 about the spacecraft x-y plane, i.e., in a plane parallel to z axis 12. The field of view is illustrated in FIG. 2 in the y-z plane, at right angles to the x-y plane, by pencil beam 27 that rotates about the x axis in the y-z plane as indicated by line 27 having arrows at either end thereof. The horizon scan enables the edges of a celestial body about which spacecraft 11 is orbiting to be detected.

By scanning one of detectors 19 or 20 about the spacecraft x-y plane while the spacecraft is rotating about z axis 12 while flying in the spherical mode, a spiral panoramic scan, as illustrated in FIG. 3 is derived. The spiral scan is attained by rotating the selected detector about the x-y plane of spacecraft 11 at a relatively low angular velocity compared to the spin velocity of the spacecraft about z axis 12. In one particular embodiment, the field of view of the selected detector is rotated 1° about the x-y plane for a 360° rotation of spacecraft 11 about z axis 12. As illustrated in FIG. 3, the scan begins with the detector field of view in spatial coincidence with the spacecraft z axis, for example, along the −z axis. As spacecraft 11 rotates about z axis 12 a narrow cone pointing downwardly is described by the detector field of view. After one revolution of the spacecraft 11 about z axis 12 the detector field of view is rotated one degree about the spacecraft x-y plane so that it is 89° below the x-y plane. For the next rotation of spacecraft 11 about z axis 12, an annular field of view having an axis displaced from the x-y plane by 89° is described. A multiplicity of annular field of views is derived in this manner so that the complete celestial sphere is covered after 180 spins of spacecraft 11 about z axis 12. If spacecraft 11 spins about z axis 12 at a rate on the order of 50 revolutions per minute, a complete panoramic scan of the celestial sphere is provided in 3.6 minutes.

As spacecraft 11 travels between celestial bodies for example, the earth and the moon, it detects visible radiation from relatively nearby celestial bodies, i.e., the earth, sun and moon. Signals indicative of the inclination angle of the selected scanner about the x-y plane and relative occurrence times of the sun pulse and target detection are transmitted back to a ground station by means (not shown) to enable the attitude of the spacecraft to be determined by a computer. After the spacecraft attitude has been calculated command signals are transmitted back to the spacecraft to control the spacecraft attitude by well known means.

DETECTOR ASSEMBLY

Figure 4:
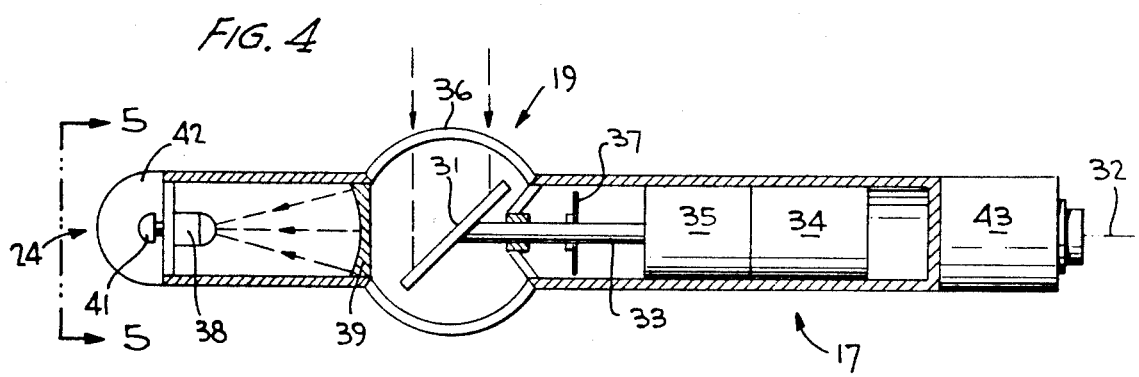
FIG. 4 is a cross-sectional view of one embodiment of a scanning detector and solar detector assembly employed on the spacecraft illustrated in FIGS. 1 and 2.
Figure 5:
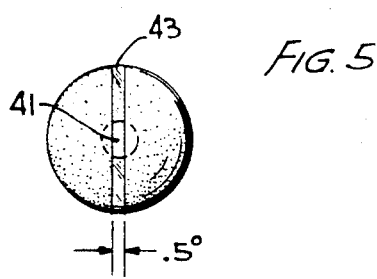
FIG. 5 is a front view of the solar detector illustrated in FIG. 4.

Reference is now made to FIGS. 4 and 5 of the drawing wherein there is illustrated one embodiment of the sensor assemblies 17 and 18. Since assemblies 17 and 18 are identical, the description of FIGS. 4 and 5 is valid for each, and the description of FIGS. 4 and 5 will be with regard to assembly 17.

Scanning detector 19 of assembly 17 includes planar mirror 31 that is inclined at an angle of 45° relative to longitudinal axis 32 of assembly 17, which axis lies in the spacecraft x-y axis. By positioning mirror 31 so that its field of view is in a plane at right angle to the spacecraft x-y plane, no cone of silence occurs in the resulting scan while the spacecraft is flying in the spherical mode. Planar mirror 31 is rotatably driven about axis 32 by shaft 33 that is coaxial with the axis. Step motor 34 drives shaft 33 in steps through reduction gearbox 35 at different angular velocities, dependent upon the spin rate of the spacecraft and whether it is in the planar or spherical mode.

Mirror 31 is located in spherical window 36 that is coaxial with axis 32 and transparent to visible spectrum radiant energy from the sun, moon and earth. Window 36 is transparent through a 360° field of view perpendicular to axis 32, whereby rotation of mirror 31 through 360° about axis 32 results in coverage of a 360° annulus. To monitor the angular position of mirror 31 about axis 32, and consequently the spacecraft x-y axis, shaft encoder 37 is fixedly mounted on shaft 33. Shaft encoder 37 may be of any well-known type, but preferably includes nine binary output levels to provide the desired accuracy for determining the angular position of shaft 33.

The rotating visible light images propagated through spherical window 36 and reflected from mirror 31 are transmitted to optical photodetector 38 via focus lens 39, having its axis coincident with axis 32. The focal length of lens 39 is such that the image reflected from it is focused on optical photodetector 38. Photodetector 38 can be of the relatively insensitive type responsive to visible light energy since it is desired to detect the relatively strong, visible light target images from the earth, moon and sun. It is to be understood, however, that the scanning principles of the invention are equally applicable to other types of detectors.

Fixedly mounted at the end of detector assembly 17 is solar pulse detector 24. Solar pulse detector 24 includes photodetector 41 having a 180° field of view in the spacecraft y-z plane, i.e., in the plane of the paper illustrated in FIG. 4. The field of view in the spacecraft x-y plane, at right angles to the plane of the paper, is relatively narrow, typically on the order of 0.5° of arc, as illustrated in FIG. 5. This result is achieved by forming detector 41 as a hemispherical element which is implanted within hemisphere 42, mounted at the end of assembly 17. Hemisphere 42 is opaque to solar energy over its entire face, except for a relatively narrow transparent slit 43. Slit 43 has an arcuate extent of 180°, from one edge of hemisphere 42 to the other edge thereof, in the y-z plane; in the x-y plane the arcuate slit has a lateral extent which is sufficiently narrow to restrict the field of view of assembly 24 to approximately 0.5° of arc.

Signals derived from solar detector 41 and photodetector 38 are fed via wires (not shown) to electronics package 43 described in detail infra. Package 43 is also responsive to solar sensor 26, an assembly identical to that illustrated for solar detector 41 and hemisphere 42 but having a field of view displaced by a 180°, and feeds signals to an electronic processor in spacecraft 11.

ELECTRONICS

Reference is now made to the system block diagram, FIGS. 6a and 6b wherein certain elements included within assemblies 17 and 18 are illustrated. Those elements associated with assembly 17 are designated as step motor 34, shaft 33, encoder 37 and scanning photodetector 38, while the corresponding elements incorporated in assembly 18 are designated by the same reference numerals with the suffix .1, whereby the step motor of assembly 18 is designated 34.1, the shaft 33.1, the encoder 37.1 and the scanning photodetector 38.1. (Scanning photodetectors are frequently referred to hereafter as scanners.) To simplify FIGS. 6a and 6b, all connections are not shown; instead, functional indications of certain signals are indicated on input and output terminals. Those terminals having the same functional indication are connected together.

The system of FIGS. 6a and 6b responds to a multiplicity of signals transmitted from a ground station to spacecraft 11. To simplify the exposition, it is assumed that the signals have been received, detected and fed to appropriate lines for enabling the electronics system of FIGS. 6a and 6b to function. It is also assumed that other signals which are constantly generated within the spacecraft are supplied to appropriate input terminals of the electronic network of FIGS. 6a and 6b. The signals fed to the electronic network from external sources are: mode gate source 61 which has a binary zero value to indicate that the spacecraft is flying in a planar mode and a binary one value to indicate that the spacecraft is flying in the spherical mode; measure clock source 62 which selectively generates clock pulses of 400, 100 or 25 Hertz, depending upon the rotation rate of 50, 12 or 4 revolutions per minute of spacecraft 11 about axis 12; 100 Hertz clock source 63 which is utilized while the spacecraft is in the planar mode; 200 Hertz clock source 64 for controlling the readout of information to serial data output line 65 which is connected to a transmitter that sends signals to a ground link; scanner command source 66 which is a binary signal to control activation of scanners 38 and 38.1 while the system is in the spherical mode; manual command source 67, a binary signal commanding the system to advance in response to a ground control signal; command source 69 for controlling which of sun pulse sources 24 or 26 is employed; and frame gate source 68, a source of rectangular waveform driving the circuitry and controlling stepping of motors 34 and 34.1, as well as readout of information. Source 68 derives a periodic waveform having a positive, binary one value for a time interval of 11.52 seconds and a ground or binary zero value for a period of 3.84 seconds while the spacecraft is in the planar mode and while the spacecraft is in the spherical mode, rotating about z axis 12 at 12 revolutions per minute. For spherical mode rotation of spacecraft 11 about axis 12 at an angular velocity of 50 revolutions per minute, the waveform of source 68 includes equal duration binary one and zero periods, each equal to 3.84 seconds; for spherical mode rotation of spacecraft 11 at 4 revolutions per minute, source 68 derives a waveform having a binary one level for 46.08 seconds and a binary zero level for 3.84 seconds.

The electronic network of FIGS. 6a and 6b also includes inputs responsive to optical sensors 38 and 38a in scanning detector assemblies 17 and 18. These sensors, together with a sun pulse selectively fed to the electronic network from photodetectors 24 and 26, enable the position of a celestial body or target viewed by one of detectors 38 or 38.1 to be ascertained. Sun pulse sources 24 and 26 are selectively fed through switch 71, controlled by bilevel source 69, to level detector 72, which derives a binary one level only in response to the input thereof being above a predetermined level. Thereby, the output of level detector 72 can be considered as a sun pulse input to the electronic network to indicate the angular position of the spacecraft aligned with the spacecraft with respect to the sun during each rotation of spacecraft 11 about z axis 12. To enable the position of the detectors 38 and 38.1 to be ascertained about the x-y plane in the y-z plane, the electronic network is also responsive to shaft position encoders 37 and 37.1, each of which derives a nine bit binary output signal.

To enable an indication to be derived that a target is in the field of view of scanning sensors 38 and 38.1, the output voltages of the sensors are respectively fed to level detectors 73 and 74. The output voltages of level detectors 73 and 74 have a binary one value in response to the inputs thereof being above a predetermined level and a zero value in response to the inputs thereof being equal to or less than the predetermined level. The predetermined level for level detectors 73 and 74 are selected to equal the minimum light in the field of view of scanners 38 and 38.1 when relatively nearby celestial bodies, such as the sun or illuminated moon or earth, are in the sensor field of view. In response to celestial bodies having a lower detected light level being in the field of view of the sensors, the input voltages to level detectors 73 and 74 are below the predetermined level, whereby the detector output has a binary zero value.

The binary levels derived from detectors 73 and 74 are respectively fed to one input of AND gates 75 and 76, each having a second input respectively responsive to bilevel voltages indicative of which of scanners 38 and 38.1 is being utilized. The apparatus for deriving the input signals indicative of the scanner being utilized, i.e., scanned about the spacecraft x-y axis, is described infra. In response to scanner 38.1 being utilized, a binary one level is applied to AND gate 75, while a binary zero level is applied to AND gate 76. In an opposite manner, during the interval while scanner 38.1 is being employed to the exclusion of sensor 38, a binary one input is applied to AND gate 76 and a binary zero level is applied to AND gate 75. Thereby, a binary one output can be derived from one of AND gates 75 or 76 corresponding with the sensor 38 or 38.1 being driven, and the output of the selected AND gate has a binary one level only in response to sufficient light falling on one of sensors 38 or 38.1 to indicate that a target is in the sensor field of view. Binary one signals are coupled from AND gates 75 and 76 through OR gate 77, the output of which is indicative of a target being detected by the selected one of scanners 38 or 38.1. The output of OR gate 77 is supplied to a qualification circuit 79 which is used to insure that the pulse is of sufficient duration to be considered a target thereby eliminating the rapid response characteristics of a terminator. The output of OR gate 77 is also fed to inverter 78, which derives an output signal having a binary one level whenever no target is detected. For convenience, the output signals of OR gate 77 and inverter 78 are referred to as acquisition of signal (AOS) and loss of signal (LOS), respectively.

The signals fed to AND gates 75 and 76 indicative of the selected scanner are derived by combining signals generated by mode gate source 61, scanner command source 66 and frame gate 68. While the spacecraft is flying in the spherical mode, a binary one is derived by source 61, while the level of source 66 indicates which of scanners 38 or 38.1 is selected. When the output of scanner command source 66 is a binary zero level, an indication is provided that scanner 38 is selected, while a binary one level derived from source 66 indicates that scanner 38.1 is selected. The binary one level spherical mode indication derived from source 61 is combined in AND gates 81 and 82 with signals indicative of the state of scanner command source 66. To this end, the output of source 66 is directly fed to the input of AND gate 81, while the complement of the scanner command source 66 signal is fed to AND gate 82 via inverter 83. Thereby, with the spacecraft in the spherical mode and scanner 38 being selected by source 66, a binary one level is derived from OR gate 84 and fed to one input of AND gate 75. In the opposite manner, AND gate 81 derives a binary one level while the spacecraft is in the spherical mode and scanner 38.1 is selected by source 66. The binary one output of AND gate 81 is fed through OR gate 85 to the input of AND gate 76.

While the system is in the planar mode, scanning sensors 48 and 38.1 are alternately driven, after each has rotated through 360°. This is in contrast with the spherical mode operation wherein only one selected scanner is driven and the other scanner is held in reserve in the event of failure to serve as a redundant unit. To derive alternate binary levels for driving sensors 38 and 38.1 and indicators for the position of the sensors during the planar mode, the output of frame gate source 68 is fed to the only input of flip-flop 86. Flip-flop 86, like all other flip-flops included in the circuit, changes state in response to positive going edges being fed thereto and remains in the state to which it was last activated until a positive going edge is fed thereto. Flip-flop 86 is slightly different from all other flip-flops in the circuit, however, because it includes only one input and the state thereof changes in response to every positive going input pulse. In all other flip-flops the different stages of the flip-flops include separate inputs so that they are activated to the state corresponding with the last stage receiving a positive going input. Flip-flop 86 functions as a frequency divider for the output of frame gate source 68 so that positive going waveform edges are respectively derived from the set and reset outputs thereof in time coincidence with one-half of the positive and negative going waveform edges of source 86.

To enable indications of which of scanners 38 or 38.1 is being driven regardless of the spacecraft mode, network 80 is provided. Network 80 is responsive to mode indicating signals derived from source 61 and inverter 94, respectively having binary one values to indicate the spherical and planar modes. In the planar mode, AND gates 91 and 93 are enabled by the positive, binary one output of inverter 94 to that binary ones are generated at the outputs of the gates to indicate operation of scanners 38 and 38.1, respectively. To this end, AND gates 91 and 93 are respectively responsive to the reset and set outputs of flip-flops 86. In the spherical mode, AND gates 81 and 82 are enabled by a binary one output of mode gate 61 to selectively pass the scanner command indicating output of source 66. To this end, AND gate 81 is directly responsive to the output of source 66, while gate 82 is fed by the output inverter 83 that is driven by source 66. Thereby, while spacecraft 11 is in the spherical mode a binary one output is generated by gate 81 when scanner 38.1 is selected but a binary one is generated by gate 82 when scanner 38 is selected. To indicate scanner 38 is selected the binary one outputs of AND gates 82 and 91 are combined in OR gate 84; to indicate selection of scanner 38.1 the binary one outputs of AND gates 81 and 93 are combined in OR gate 85. As seen infra the scanner indicating signals derived from gates 84 and 85 enable the positions of the scanners to be derived in both modes and assist in controlling the drive of step motors 34 and 34.1 in the spherical mode.

The stepping of the selected sensor 38 or 38.1 is responsive to the output signals of mode gate source 61, scanner command source 66 and frame gate source 68. In addition, while the spacecraft is operating in the spherical mode the selected scanner is driven in response to the sun pulse output of level detector 72 and the AOS and LOS output signals of OR gate 77 and inverter 78.

In the spherical mode, the selected sensor is normally driven about the x-y axis in 1° steps each time the spacecraft rotates about the z axis thereof, as detected by a sun pulse output of level detector 72. Stepping of the selected sensor 38 or 38.1 in this manner is performed by combining the output of level detector 72 with the output of mode gate source 61 in AND gate 95. AND gate 95 includes a further input, derived from the set output of flip-flop 103 that is a binary one value except during the unusual circumstance, referred to herein as an anomaly, of a target being detected by the selected scanner 38 or 38.1 in time coincidence with a sun pulse being generated by detector 72. Thereby, a binary one pulse is normally derived from AND gate 95 when spacecraft 11 is in the spherical mode and the sun is detected by one of detectors 24 or 26 and is fed to the sensor 38 or 38.1 selected to be driven.

Selection of step drive for sensor 38 or 38.1 is in response to the output of scanner command source 66. To this end, the binary one output of source 66, indicative of selection of scanner 38.1, is applied directly as an enabling input to AND gate 104. With gate 104 enabled pulses fed thereto from AND gate 95 via OR gate 105 are coupled through OR gate 106 to step motor 34.1. Each pulse applied to step motor 34.1 advances the angular position of sensor 38.1 relative to the x-y plane. In response to each input pulse applied to step motor 34.1 shaft position encoder 37.1 and scanner 38.1 are driven by a predetermined relatively small angle equal approximately to the field of view of the scanner so that an entire annular field of view is obtained. In response to scanner command source 66 having a binary zero level, to indicate scanner 38 is to be driven, AND gate 107 is enabled since an input thereof is coupled to source 66 through inverter 108. The other input of AND gate 107 is responsive to the output of AND gate 95 as coupled through OR gate 105 so that enabling of AND gate 107 results in stepper motor 34, shaft position encoder 37 and scanner 38 being driven in small angular increments about the spacecraft x-y axis in response to a sun pulse output of level detector 72.

When a target, e.g., the sun, illuminated earth or moon, is detected by the selected scanner 38 or 38.1 simultaneously with derivation a sun pulse by detector 72 the angular position of the selected scanner is not changed until the electronic system is ready to read out the position of the selected scanner. Thereby errors in the position of the selected scanner during the critical time of target position readout are avoided. As seen infra, data read out is in response to the trailing, negative going edge of waveform is inhibited until after the trailing edge of the frame gate waveform occurs whenever a target is detected simultaneously with a sun pulse. It is to be understood that a sun target is not derived from the selected ones of scanners 38 or 38.1 simultaneously with a sun pulse from detector 72 because of the widely separated pointing angles of scanners 38 and 38.1 from detectors 24 and 26.

To advance the angular position of the selected scanner 38 or 38.1 when a target is no longer being detected by the selected scanner after the sun and target pulses occur at the same time and after the trailing edge of the frame gate waveform the set input of flip-flop 103 is responsive to a signal derived from AND gate 102. A binary one output signal of AND gate 102 is indicative of the LOS signal derived from inverter 78 having a binary one level to indicate the target is no longer in the field of view of the selected scanner. Other requirements for deriving a binary one output of AND gate 102 are that a trailing edge of the waveform of frame gate source 68 has been generated and the frame gate source is presently generating a binary one level to assure advancing of the selected scanner after data readout has been completed. To these ends, the output of frame gate source 68 is reversed in phase by inverter 96 which drives one shot trigger network 97. One shot trigger network 97 derives a relatively short duration pulse in response to a positive going output pulse of inverter 96 being derived; the positive going output pulse derived by inverter 96 is in substantial time coincidence with the negative going trailing edge of frame gate source 68. The short duration pulse derived by one shot trigger circuit 97 is applied to AND gate 98, which is enabled by the set output of flip-flop 99. The set input of flip-flop 99 is responsive to the LOS signal derived at the output of inverter 78. Thereby, AND gate 98 generates a short duration binary one pulse when no target is in the field of view of the selected one of sensors 38 and 38.1 at the time when a negative going transition occurs in the output of frame gate source 68 and this binary one pulse is applied to the set input of flip-flop 101. The set output of flip-flop 101 is combined with the output of frame gate source 68 in AND gate 102 which drives the set input of flip-flop 103. Each of flip-flops 99, 101 and 103 includes a reset input responsive to the AOS signal so that each of AND gates 98, 102 and 95 is disabled whenever a target is in the field of view of the selected one of scanner 38 or 38.1. Flip-flop 99 is triggered into the set state as soon as a target is no longer detected by the selected scanner; flip-flop 101 is triggered to the set state after the trailing edge of source 68 occurs while no target is detected by the selected scanner; and flip-flop 103 is triggered to the set state while the set output of flip-flop 101 generates a binary one level and a binary one is generated by source 68 to satisfy the spherical mode requirement that sun pulses can advance the selected scanner only while the sun pulse and target are not in time coincidence and after readout of scanner position.

To recaptulate the spherical mode drive for the selected scanner, under normal circumstances when no target is detected by the selected scanner one sun pulse is fed through AND gate 95 to the selected step motor 34 or 34.1 to drive the scanner in 1° steps about the x-y plane for each revolution of the spacecraft about z axis 12. Stepping of the selected scanner 38 or 38.1 proceeds until the selected scanner detects a target, i.e., a celestial body having a sufficiently high signal to cause a binary one AOS signal to be derived from OR gate 77. In response to a binary one being derived from OR gate 77, each of flip-flops 99, 101 and 103 is activated to the reset state. Thereby, AND gate 95 is disabled so that further sun pulses cannot be transmitted through it to the selected step motor 34 or 34.1. The selected scanner 38 or 38.1 thereby cannot rotate about the spacecraft x-y axis while a target is being detected thereby. This is a desirable feature because it prevents possible erroneous readout of sensor angular position while a celestial body is being detected thereby. After the spacecraft has rotated about its z axis so that the selected one of scanners 38 or 38.1 no longer is detecting a target the AOS signal derived from OR gate 77 is returned to a binary zero level and a binary one output is derived from inverter 78. In response to the binary one input of inverter 78 and a binary one value being derived from frame gate 68 after the frame gate generates a trailing edge, flip-flop 103 is again activated to the set state and the selected scanner can again be stepped at its normal rotation rate of one degree for each spin revolution of the spacecraft about axis 12. Since the spacecraft makes at least two revolutions about its z axis 12 during each period while frame gate 68 is deriving a high, binary one level while the spacecraft is operating in the spherical mode, it is seen that the selected sensor has a tendency to repeatedly view the same celestial body once that body has been detected. Viewing of the detected celestial body continues until relative movement between the spacecraft and the body takes it out of the field of view of the scannable detector 38 or 38.1 for several revolutions of the spacecraft about its z axis.

Alternate driving of step motors 34 and 34.1 and scanners 38 and 38.1 is independent of the sun pulse output of level detector 72 while the spacecraft is in the planar mode. While in the planar mode, step motors 34 and 34.1 are sequentially driven on a periodic basis in response to the signal derived by frame gate source 68. To this end, while the spacecraft is in the planar mode, AND gates 111 and 112 are partially enabled by a binary one output of inverter 94. AND gates 111 and 112 are also partially enabled by complementary signals derived from the set and reset outputs of flip-flop 86. Since the set and reset outputs of flip-flop 86 are alternately binary one and zero levels, at a submultiple of the basic rectangular wave frequency derived from frame gate source 68, AND gates 111 and 112 are thereby alternately enabled. AND gates 111 and 112 are driven in parallel by the output of AND gate 113, having one input responsive to 100 Hertz clock source 63 and a second input responsive to the set output of flip-flop 114. The set input of flip-flop 114 is responsive to the rectangular wave output of frame gate source 68, while the reset input of the flip-flop is a binary one level whenever the selected scanner goes through a zero angle in the spacecraft x-y plane. The apparatus for deriving the input to the reset stage of flip-flop 114 is described infra. The output of flip-flop 114 is thereby a binary one level except when both scanners are at a zero angle position. As soon as the leading edge of frame gate source 68 occurs after both scanners 38 and 38.1 have reached an angle of zero degrees, a binary one output is derived from the set output of flip-flop 114 to enable AND gate 113 to pass pulses from clock source 63 through the enabled one of AND gates 111 or 112 to the selected step motor 34 or 34.1. The 100 Hertz pulses applied to step motors 34 and 34.1 drive the step motors and scanners 38 and 38.1 at a relatively high angular velocity, on the order of 33 revolutions per minute, about the spacecraft x-y plane.

To enable either of scanners 38 or 38.1 to be driven at a relatively high velocity about the spacecraft x-y axis in response to a ground command, source 67 is energized to have a binary one level. Simultaneously, scanner command source 66 is energized to a binary zero or binary one level, depending upon whether it is desired to scan sensor 38 or sensor 38.1. The binary one pulse derived from source 67 is fed to the set input of flop-flop 115. The set output of flip-flop 115 is supplied as an enable signal to AND gate 116, having a second input responsive to 100 Hertz clock source 63. The output of AND gate 116 is applied in parallel to one input of OR gate 105 and the input of divide-by-eight frequency divider 117. The output of frequency divider 117 is applied to the reset input of flip-flop 115. Thereby, in response to a binary one pulse being derived from source 67, eight pulses from source 63 are gated through AND gate 116, OR gate 105 and one of AND gates 104 or 107, dependent upon the level of source 66, to a selected one of step motors 34 and 34.1. After the selected motor has been driven to rotate the selected sensor about the spacecraft x-y axis by 8°, flip-flop 115 responds to the output of divider 117 and returns to the reset state to disable AND gate 116. If it is again desired to drive a selected scanner by eight degrees, a further pulse is derived from source 67 and the same operations are repeated for one of the scanners, depending on the level derived from scanner command source 66.

Consideration is now given to apparatus for reading out the position of the selected scanner 38 or 38.1. The position of the selected scanner relative to the x-y plane, in the y-z plane, is monitored by shaft position encoders 37 and 37.1, each of which derives a parallel, nine bit output signal on two sets 121 and 122 of nine lines. The shaft position indicating signals on lines 121 and 122 are fed to commutator gating network 123 that includes nine parallel output lines 124. Gating network 123 is responsive to the selected scanner outputs of OR gates 84 and 85 so that only one of the nine bit signals derived from encoders 37 and 37.1 is selectively fed to lines 124. To this end, network 123 includes two sets 125 and 126 of nine different AND gates; the gates of set 125 are enabled in response to the output of OR gate 84 that indicates selection of scanner 38 and the gates of set 126 are enabled in response to the output of OR gate 85 indicative of scanner 38.1 being selected. The AND gates of set 126 are responsive to the nine output lines 121 of encoder 37, while AND gates 125 are responsive to the nine output lines 122 of shaft position encoder 37.1. The AND gates in network 123 responsive to correspondingly numbered bits derived from encoders 37 and 37.1 are combined in nine OR gates 127 which feed lines 124.

To enable an indication to be derived that the selected scanner is positioned in the x-y plane, at a zero angle, the nine output bits of network 123 are combined in NOR gate 131, which derives a binary one output signal only in response to all of the inputs thereof being a binary zero level, commensurate with a zero angle being read from the shaft position encoder 37 or 37.1 associated with the selected scanner. The output of NOR gate 131 is fed to one shot trigger network 132 which derives a relatively short duration pulse in response to the leading, positive going edge of the NOR gate output. The relatively short duration pulse generated by one shot network 132 is fed to the reset input of flip-flop 114 so that alternate actuation of step motors 34 and 34.1 can be performed during the planar mode.

To enable the most significant bit derived from network 123 to be coupled to an output network including 10 bit parallel to zero register 133 while the spacecraft is operating in the spherical mode, the most significant bit lead of line 124 is fed to AND gate 134, having a second input responsive to the spherical mode output of source 61. Thereby, with the spacecraft in the spherical mode, the output of AND gate 134 corresponds with the most significant bit lead of lines 124, but in the planar mode a binary zero is always derived from AND gate 134. The output signal of AND gate 134 is fed through OR gate 135 to the most significant bit input of parallel to serial register 133.

The most significant bit input parallel to serial register 133 is indicative of the selected scanner when the spacecraft is operating in the planar mode. To this end, AND gate 136 is provided and includes a first input enabled in response to the planar mode output of inverter 94. A second input to AND gate 136 is responsive to the scanner select flag output of the set stage of flip-flop 86. With the spacecraft operating in the planar mode, the said output of flip-flop 86 is a binary one level while step motor 34 and scanner 38.1 are being driven and is a binary zero level while step motor 34 and 38 are being driven. Thereby, a binary zero signal is derived from AND gate 136 while the spacecraft is operating in the planar mode and scan sensor 38 is selected to be driven while a binary one output is derived from AND gate 136 during the interval when scanner 38.1 is being driven. The output of AND gate 136 is fed through OR gate 135 to the most significant bit input of parallel to serial register 133.

Parallel to serial register 133 includes ten stages, the least significant one of which is grounded and is thereby always storing a binary zero level to enable the register always to be cleared to zero. The next eight stages of register 133 are responsive to the eight least significant bits derived from gating network 123 on lines 124. The most significant bit stage of register 133 is responsive to the output of OR gate 135 as indicated supra. Register 133 is periodically responsive to the inputs thereof immediately after the negative going trailing edge of the waveform derived from frame gate source 68 is derived. To this end, the output of one shot trigger circuit 97 is fed to register 133 to enable the register to be responsive to the input signals thereof. After the input signals have been read into register 133 the contents of the register stages are read out in sequence on line 136 in response to a 200 Hertz output of clock source 64.

Consideration is now given to apparatus for monitoring the angular position of a target detected by the selected scanner 38 or 38.1 relative to the derivation of a sun pulse by level detector 72 during each rotation of spacecraft 11 about its z axis 12 while the spacecraft is in the spherical mode. Essentially, the technique involves determining the time interval between detection of the sun pulse output of level detector 72 and the reception time of a target by the selected one of scanners 38 or 38.1. Two time intervals are detected; in normal operation they are (1) the interval between the derivation of a sun pulse and the initial detection of a target; and (2) the interval between the initial and final target detection times, i.e., the length of the interval while the selected scanner has the target in its field of view. The technique for determining the two intervals involves counting a number of pulses having a repetition frequency proportional to the angular velocity of spacecraft 11 about z axis 12.

To these ends, nine and seven bit counters 137 and 138 are provided. Each of counters 137 and 138 includes an enabling AND gate input whereby signals are selectively fed to the counters in response to command signals. In addition, counters 137 and 138 include reset inputs for enabling the counts stored therein to be cleared or reset to zero. Associated with each stage of counters 137 and 138 is an output line, whereby the binary numbers stored in the two counters can always be indicated and monitored.

In the spherical mode, counters 137 and 138 indicate time intervals (1) and (2). To this end, the sun pulse output of level detector 72 is fed through AND gate 141 that is enabled by the binary one output of mode gate source 61. The output of AND gate 141 is fed through OR gate 142 to the set input of flip-flop 143, having a set output which is fed as an enabling signal to the input of counter 137 so that counter 137 is enabled in response to a sun pulse output being derived by level detector 72. With the input of counter 137 enabled, pulses derived from measure clock source 62 of a selected frequency, directly proportional to the rotational velocity of spacecraft 11 about z axis 12, are fed to counter 137 to advance the counter. The pulses from source 62 are fed as a count advance input to counter 137 through AND gate 144 which is enabled in response to a binary one spherical mode indicating level being derived from mode gate 61. If no target is detected during the revolution of spacecraft 11 about z axis 12 after the sun pulse is detected, counter 137 is continuously advanced since the set output of flip-flop 143 is maintained at a binary one level.

Counter 137 receives pulses from clock source 62 until an AOS signal is derived from the output of OR gate 77 to indicate that a target has been detected by the selected one of scanners 38 or 38.1 if the system is operating under normal circumstances when a sun pulse is not in time coincidence with a target pulse. Under such circumstances, the AOS output of OR gate 77 is fed through enabled AND gate 143 to the reset input of flip-flop 143 to change the state of flip-flop 143 and disable the input to counter 143. If a target is detected and the sun pulse is in time coincidence with a target signal, considered herein to be an anomaly, flip-flop 143 remains in the set state so that counter 137 continues to be enabled to be responsive to clock pulses from source 62 until a target is detected that is not in time coincidence with a sun pulse. To these ends, the reset input of flip-flop 143 is responsive to the output of AND gate 146, having one input responsive to the AOS output of OR gate 77 and a second input responsive to the reset output of flip-flop 147. The set input of the flip-flop is driven by the output of AND gate 148, having one input responsive to the sun pulse output of OR gate 142 and a second input driven by the AOS output signal of OR gate 77 so that a binary one set output of flip-flop 147 flags an anomaly. The anomaly is removed simultaneously with enabling the drive of the selected scanner by coupling the output of AND gate 102 to the reset input of flip-flop 147.

In normal operation, LOS counter 138 is activated during interval (2), i.e., while a target is detected by the selected scanner. When an anomaly occurs, counter 138 is advanced only during the time interval between the derivation of the sun pulse and the occurrence of a binary one LOS output of inverter 78. To these ends, the set output of flip-flop 143 is coupled through inverter 151 to the set input of flip-flop 152, having a reset input responsive to the LOS output signal of inverter 78. The set output of flip-flop 152 is coupled through OR gate 153 to enable counter 138 to be responsive to clock pulse source 62 as coupled through AND gate 144 and OR gate 145. To control counter 138 for an anomaly, the anomaly flag derived from the set output of flip-flop 147 is coupled to the set input of flip-flop 154, the reset input of which is responsive to the LOS output of inverter 78. The binary one set output of flip-flop 154 enables counter 138 only between the interval when the selected scanner 38 or 38.1 acquires a target simultaneously with the derivation of a sun pulse from level detector 72 and the derivation of an LOS signal from inverter 78. The LOS signal resets flip-flops 152 and 154, whereby counter 138 is enabled only during the interval stated for the anomaly.

During the spherical mode each of counters 137 and 138 is reset to zero once during each revolution of spacecraft 11 about axis 12 to enable accurate indications of (1) and (2) to be derived during each spin of the spacecraft. To this end, the output of AND gate 95 is fed through OR gate 149 to the reset input of counters 137 and 138 which responds only to the leading, positive going edge fed thereto to set a zero in each stage of the counters.

While the spacecraft is flying in the planar mode, counter 137 measures the time interval between the derivation of the leading positive going edge of the waveform of frame gate source 68 and the detection of a target by the selected one of scanners 38 or 38.1, as indicated by the AOS output signal of OR gate 77. To these ends, counter 137 is reset to zero in response to the leading edge of the waveform derived from frame gate source 68, as coupled through AND gate 161, enabled by a binary one output of inverter 94 that indicates the spacecraft is flying in the planar mode. The output of AND gate 161 is fed through OR gate 149 to the reset input of counters 137 and 138 to set the counters to a zero state. Simultaneously with counter 137 being reset to zero, the counter input is enabled by feeding the output of AND gate 161 through OR gate 142 to the set input of flip-flop 143. The resulting, binary one set output of flip-flop 143 enables counter 137. With the input of counter 137 enabled, pulses from 100 Hertz clock source 63 are fed through AND gate 163, enabled by the binary one planar mode indicating output of inverter 94. The clock pulse output of enabled AND gate 163 is fed through OR gate 145 to drive counter 137. After initiation of operation of counter 137 in response to the leading edge of the frame gate source waveform, counters 137 and 138 respond to the clock pulses of source 63 and the LOS and AOS signals in the same manner that they respond to the clock pulses of source 62 and LOS and AOS signals while operating normally in the spherical mode, as described supra.

To read out the contents of counters 137 and 138 after the trailing edge of the waveform of source 68 occurs, parallel transfer gating networks 164 and 165 are provided. Parallel transfer gating network 164 includes ten AND gates, nine of which are responsive to the nine output leads of counter 137. The tenth gate within network 164 is responsive to the anomaly flag set output of flip-flop 147. Gating network 164 is responsive to the seven output bits of counter 138. Parallel transfer gating networks 164 and 165 include enable inputs driven in parallel by the set output of flip-flop 101. Thereby, parallel transfer gating networks 164 and 165 feed the parallel inputs thereof to the parallel outputs thereof only in response to the trailing edge of frame gate source 68 occurring after an LOS signal is derived from inverter 78 to preclude readout while a target is being detected.

The output signals of gating networks 164 and 165 are applied to 10 bit parallel to serial and seven bit parallel to serial registers 166 and 167, respectively. Registers 166 and 167 are driven in response to the output of one shot trigger circuit 97; the output of the trigger circuit is applied to the registers with sufficient time delay to enable gating networks 164 and 165 to load the parallel to serial registers. After parallel to serial registers 133, 166 and 167 have been loaded, 200 Hertz signals are fed thereto from clock source 64. Thereby, a serial data train of 27 bits is read out to serial data output terminal 65 during the interval between successive negative going, trailing edges of the waveform of frame gate 68. The signal transmitted to serial data output terminal 65 is transmitted to a ground station (not shown) which can determine the attitude of spacecraft 11 utilizing a digital computer program.

In response to an analysis of the data transmitted through terminal 65 to the ground station, signals at the ground station are generated to control the attitude of the spacecraft. These signals are relayed via a radio link back to the spacecraft to control motive means on the spacecraft so that the spacecraft is at the desired attitude.

While there has been described and illustrated one specific embodiment of the invention, it will be clear that variations in the details of the embodiment specifically illustrated and described may be made without departing from the true spirit and scope of the invention as defined in the appended claims.

We claim:

1. In an attitude sensing system for a spacecraft having a z axis about which the spacecraft is adapted to spin for stabilization, said z axis being at right angles to an x-y plane of the spacecraft, a first radiant energy detector means having a first relatively narrow field of view and first means for rotating the first field of view about a first axis contained in said spacecraft x-y plane.

2. The system of claim 1 further including means responsive to the first detector means for inhibiting rotation of the field of view about the first axis while a target is detected by the detector means.

3. The system of claim 1 further including means for monitoring the angular position of the first field of view about the spacecraft x-y plane, and means for monitoring the angular position about the z axis of the first field of view when a target is detected by the detector means.

4. The system of claim 1 further including means for monitoring the angular position about the z axis of the first field of view when a target is detected by the detector means.

5. The system of claim 4 wherein said monitoring means includes a reference body detector fixedly mounted on the spacecraft, and means for measuring the time displacement between detection of a reference body by the reference body detector and target by the first detector means.

6. The system of claim 5 further including means for measuring the length of time a target is detected by the first detector means.

7. The system of claim 5 further including means responsive to simultaneous detection of a reference body and a target for signalling the simultaneous detection, and means responsive to signalling of the simultaneous detection for altering the normal operation of the time measuring means.

8. The system of claim 7 wherein the first rotating means includes means for stepping the spacecraft about the x-y plane in response to detection of the reference body except when the simultaneous detection is signalled.

9. The system of claim 4 additionally comprising: a second radiant energy detector means having a relatively narrow field of view; and second means for rotating said second field of view about a second axis which is substantially parallel to said x-y plane.

10. The system of claim 4 wherein said first means for rotating, rotates said first field of view through 360°.

11. The system of claim 9 wherein said first and second means for rotating are responsive to additional means for causing alternate rotations of said first and second fields of view.

12. The system of claim 11 wherein said first and second fields of view are alternately rotated through 360 degrees.

13. The system of claim 10 further including means for substantially periodically deriving a spin reference pulse, and means for measuring the time interval between the occurrence time of the reference pulse and detection of a target by the first radiant energy detector means.

14. The system of claim 13 wherein the means for deriving the reference pulse includes a periodic time reference waveform source.

15. The system of claim 13 wherein the means for deriving the reference pulse includes a reference body detecting means having a field of view fixed relative to said axis and plane.

16. The system of claim 15 wherein the field of view of the reference body detecting means is different from the field of view of the first radiant energy detector means.

17. The system of claim 13 wherein the first field of view is rotated in steps in response to the reference pulse.

18. The system of claim 17 further including means for inhibiting rotation of the first field of view while a target is detected by the detector.

19. The system of claim 13 further including means for monitoring the angular position of the first field of view relative to the x-y plane.

20. A method of scanning the celestial sphere with a detector having a relatively narrow field of view, said detector being located on a spacecraft having a z axis about which the spacecraft is adapted to spin for stabilization and an x-y plane at right angles to the z axis, said field of view being rotatable about a first axis substantially contained in the x-y plane, comprising the steps of rotating the spacecraft at a relatively high angular velocity about the z axis while rotating the field of view at a relatively low angular velocity about the first axis, whereby a spiral scan of the sphere is derived from the detector.

21. The method of claim 20 wherein the field of view is rotated about the first axis through an arc substantially equal to the width of the field of view for each complete revolution of the spacecraft about the axis.

22. The method of claim 20 further including the step of inhibiting rotation of the field of view about the first axis while a target is detected by the detector.

* * * * *